US010345152B2

United States Patent
Waldron

(10) Patent No.: US 10,345,152 B2
(45) Date of Patent: Jul. 9, 2019

(54) FLAME DETECTORS AND ASSOCIATED METHODS

(71) Applicant: FFE Limited, Hertfordshire (GB)

(72) Inventor: Daniel Waldron, Cwmbran (GB)

(73) Assignee: FFE LIMITED (GB)

( * ) Notice: Subject to any disclaimer, the term of this patent is extended or adjusted under 35 U.S.C. 154(b) by 0 days.

(21) Appl. No.: 15/297,325

(22) Filed: Oct. 19, 2016

(65) Prior Publication Data

US 2017/0108381 A1 Apr. 20, 2017

(30) Foreign Application Priority Data

Oct. 19, 2015 (GB) .................................. 1518483.1

(51) Int. Cl.
| | | |
|---|---|---|
| G01J 5/02 | (2006.01) |
| G01J 5/00 | (2006.01) |
| G08B 17/12 | (2006.01) |
| G08B 29/18 | (2006.01) |

(52) U.S. Cl.
CPC ............. *G01J 5/026* (2013.01); *G01J 5/0018* (2013.01); *G08B 17/12* (2013.01); *G08B 29/185* (2013.01)

(58) Field of Classification Search
CPC .............................. G08B 17/12; G08B 29/185
USPC ...................................... 340/578; 250/339.15
See application file for complete search history.

(56) References Cited

U.S. PATENT DOCUMENTS

| | | | | |
|---|---|---|---|---|
| 4,160,163 A * | 7/1979 | Nakauchi | ................ | F23N 5/082 |
| | | | | 250/339.15 |
| 4,463,260 A * | 7/1984 | Ikeda | ..................... | G08B 17/12 |
| | | | | 250/339.15 |
| 5,064,271 A | 11/1991 | Kern et al. | | |
| 5,995,008 A * | 11/1999 | King | ..................... | G08B 17/12 |
| | | | | 250/339.15 |
| 6,153,881 A * | 11/2000 | Castleman | ............ | G08B 17/12 |
| | | | | 250/339.14 |
| 6,507,023 B1 * | 1/2003 | Parham | .................. | G08B 17/12 |
| | | | | 250/339.15 |

(Continued)

FOREIGN PATENT DOCUMENTS

| | | |
|---|---|---|
| EP | 0078442 | 5/1983 |
| GB | 2020420 | 11/1979 |

(Continued)

OTHER PUBLICATIONS

Wikipedia, 2015, "flame detection", Wikipedia.org, [online], Available from: "https://en.wikipedia.org/wiki/Flame_detection" [Accesed Mar. 22, 2016] Discloses features relating to how flame detectors operate to determin if a flame is present, 5 pages.

(Continued)

*Primary Examiner* — Jack K Wang
(74) *Attorney, Agent, or Firm* — RatnerPrestia

(57) ABSTRACT

A flame detector (1) including: a fire sensor (2a), capable of detecting a characteristic blackbody-type radiated heat signature emitted by a flaming material; and a guard sensor (2b), for detecting an at least further part of the spectrum emitted by the material and which serves to assist in rejecting false alarms, wherein, in use during detection of a flame, the guard sensor (2b) detects an amount of radiation G and the fire sensor (2a) detects an amount of radiation F, and positive detection of a flaming material depends upon the following criteria: $F>0$; $G>0$; and $F>G$.

21 Claims, 3 Drawing Sheets

(56) References Cited

U.S. PATENT DOCUMENTS

| | | | | |
|---|---|---|---|---|
| 6,515,283 | B1* | 2/2003 | Castleman | G08B 17/12 |
| | | | | 250/339.15 |
| 7,635,845 | B2* | 12/2009 | Jensen | G01J 3/36 |
| | | | | 250/338.5 |
| 8,227,756 | B2* | 7/2012 | Harchanko | F23N 5/082 |
| | | | | 250/339.15 |
| 9,587,987 | B2* | 3/2017 | Larsen | G01J 5/602 |

FOREIGN PATENT DOCUMENTS

| | | |
|---|---|---|
| JP | 6138430 | 2/1986 |
| JP | 11167687 | 6/1999 |

OTHER PUBLICATIONS

Wikipedia, 2015, "flame detector", Wikipedia.org, [online], Available from: "https://en.wikipedia.org/wiki/Flame_detector" [Accesed Mar. 22, 2016] Discloses types and constructions of known flame detectors, 4 pages.
Great Britain Combined Search and Examination Report for GB Application No. 1518483.1, dated Mar. 29, 2016, 11 pages.
European Search Report dated Mar. 29, 2017 from Application No. EP 16 19 4516.
Mike Machala, "Kerosene Lamps vs. Solar Lanterns", Stanford University, Nov. 19, 2011, 6 pages.
Unknown, "Characteristics and use of infrared detectors", Hamamatsu Technical Information SD-12, Mar. 31, 2011, 43 pages.

\* cited by examiner

FLAME DETECTORS AND ASSOCIATED METHODS

CROSS-REFERENCE TO RELATED APPLICATION

This Patent Application claims priority from UK Patent Application No. GB1518483.1, filed the 19 Oct. 2015, the disclosure of which is incorporated by reference herein in its entirety.

FIELD OF THE INVENTION

The present invention relates to flame detectors. In particular, the present invention relates to a flame detector, a method for flame detection and a further flame detector.

BACKGROUND OF THE INVENTION

Early detection of fires and flames is very important in the industrial and domestic environments. Domestic sensors tend to detect combustion bi-products which are, of course, produced after a fire has started, detection occurring once those by-products have reached the sensor—which can be some distance from the fire. Early detection of fires is essential in many environments where untold damage can occur very quickly and where there is a serious risk to safety. Flame detectors per se are known in the art and do provide early warning of the existence of fires, and such detectors are often located to monitor specific equipment, etc. where there is an increased risk of fire.

FIG. 2 (although it additionally shows aspects of the invention, it is here referred to so as to identify background information known to those skilled in the art and help set the scene) is an example of the approximate electromagnetic spectrum produced by burning petrol—line 20 represents the approximate relationship of energy vs wavelength. Line 20 may be sectioned into three approximate regions. A first region, identified with I, represents both the ultraviolet and visible regions of the spectrum; a second region, identified with II, represents the near-infrared and short-/mid-infrared, which includes a characteristic black body-type heat signature emitted by a flaming material; and the third region, identified by III, represents the mid-/long-infrared which includes the carbon dioxide (hereinafter $CO_2$) peak at 4.3 microns. Whilst it is not intended to be bound by theory, when a material becomes hot, for example during combustion, the amount of radiation (blackbody-type radiation) increases, together with a corresponding movement of the wavelength towards the shorter wavelengths. Hereinafter, ultraviolet may be designated 'UV' and infrared may be designated 'IR'.

A predominance of known flame detectors look for the signal produced by hot gases, like $CO_2$ at 4.3 microns, as this is representative of the burning of many fuels. However, not all fuels contain carbon and, as such, when a fuel such as hydrogen burns, there is no $CO_2$ peak produced. In that situation, those known detectors cannot detect the presence of a flame or fire, as the sensors used therein are entirely blind to other parts of the spectrum produced by a flaming material. Further, such detectors cannot distinguish between a flame producing $CO_2$ and $CO_2$ produced by, for example, an engine. Additionally, real-world fires typically produce a large amount of dirt, soot and smoke. The presence of smoke, soot and other particulates makes fires very challenging to detect, as the smoke created by a 'dirty' flame can block the tell-tale 4.3 micron signal. A further particular disadvantage of narrowband detectors aimed at the 4.3 micron peak is that, in a situation that the fuel is burning in a confined space, carbon monoxide might be created rather than $CO_2$, which would lead to a reduced 4.3 micron peak. This can significantly affect the speed of detection. A further disadvantage of these detectors is that, as known by those skilled in the art, 4.3 micron light is blocked by regular glass and, therefore, expensive sapphire windows must be used. Additionally, the 4.3 micron peak can be readily blocked by contaminants, such as water vapour, dirt, ice and snow. Accordingly, such known detectors are often heated and must be cleaned to ensure their correct functioning, which increases the overall cost of the unit and the running cost of the unit and associated infrastructure.

It is, therefore, understood by the Applicant that directing a flame detector to only around the 4.3 micron peak has clear disadvantages. As such, a more rounded and useful flame detector could be produced by increasing the range of wavelengths detected, which has led to a phrase coined by the Applicant: BROADSPECTRUM™.

There are many infrared sensors which exist in the marketplace, each having different characteristics of performance and cost. Generally speaking, the wider the effective range of detection of the sensor, the more expensive the sensor. Therefore, with respect to narrowband detection, this is not so much of an issue as the spectral peaks which they are intended to detect are themselves narrow; however, it becomes more of an issue when one is trying to detect wider peaks or significantly more of the spectrum emitted by a flame.

Infrared sensors come in a variety of different types, each based on a different semi-conductor metal salt. Each sensor has a different response to temperature and its relative degradation over time. As a result, detectors that rely upon interplay of various different sensors will give variable detection with temperature change and their performance will change over time as the sensors degrade at different rates. As such long-term detection of the unit can be compromised.

Further, there are a number of manufacturers who supply a range of flame detectors, each having its own detection characteristics and associated cost. Many manufacturers seem to believe that the inclusion of a plethora of sensors within the same detector provides for better detection, and sometimes this is true; however, as the sensor becomes more advanced and more numerous, the associated cost of the unit increases.

As such, there exists in the marketplace a need for a powerful (in that it is not narrowband) flame detector which, although economically produced, does not compromise on the accuracy of detection. The present invention is aimed at providing early detection of flames and fires but without the associated significant expense of various sensors on the market.

SUMMARY OF INVENTION

According to a first aspect, the present invention provides a flame detector comprising:
a fire sensor, capable of detecting a characteristic blackbody-type radiated heat signature emitted by a flaming material; and
a guard sensor, for detecting an at least further part of the spectrum emitted by said material and which serves to assist in rejecting false alarms,
in use during detection of a flame, the guard sensor is arranged to detect radiation of shorter wavelength than the fire sensor and detects an intensity of radiation G in a guard band range of wavelengths and the fire sensor detects an intensity of radiation F in a fire band range of wavelengths, wherein the guard band is narrower than the fire band and each band is distinct from the other, and positive detection of a flaming material depends upon the following criteria:
F>0;
G>0; and
F>G.

Preferably, by being distinct, a so-called sensory gap is provided between the fire band and the guard band, in which sensory gap no or practically no detection occurs.

Preferably, the guard sensor is arranged to detect the intensity of radiation G from a part of the spectrum associated with artificial light or sunlight.

Preferably, the fire sensor and/or guard sensor are arranged to operate in the wavelength region of less than about 4 µm, less than about 3.2 µm, less than about 3 µm, or less than about 2.55 µm. Most preferably, the fire sensor and/or guard sensor are arranged to operate in a wavelength region of from about 0.6 µm to about 3.2 µm, or from about 1 µm to about 3.2 µm, or from about 1 µm to about 2.2 µm.

Preferably, detection at the distinct guard band and fire band is arranged to be separated by a sensory gap of about 0.1 µm to about 1 µm, of about 0.2 µm to about 0.8 µm, of about 0.5 µm to about 0.7 µm, or of about 0.6 µm.

Most preferably, the guard band detects over a range of about 0.2 µm and the fire band detects over a range of about 0.4 µm.

Preferably, the fire sensor is arranged to detect radiation having a wavelength range of: from about 1.6 µm to about 2.4 µm; from about 1.7 µm to about 2.3 µm; or from about 1.8 µm to about 2.2 µm; or other distinct ranges within any of those extremes.

Preferably, the guard sensor is arranged to detect radiation having a wavelength range of: from about 0.6 µm to about 1.4 µm; from about 0.7 µm to about 1.3 µm; from about 0.8 µm to about 1.2 µm; or from about 1 µm to about 1.2 µm; or other distinct ranges within any of those extremes.

Preferably, the detector is arranged to reject or filter-out radiation of regular modulation.

Most preferably, the detector is arranged to react only upon detecting radiation of irregular modulation at about 1 Hz to about 30 Hz or about 1 Hz to about 25 Hz.

Preferably, the fire sensor and the guard sensor comprise a common sensor comprising PbS or InGaAs. Most preferably, the sensors are arranged to have different optical filters.

Preferably, the fire sensor and the guard sensor are different sensors; however, they could be the same sensor arranged to act firstly as a fire sensor and secondly as a guard sensor or vice versa.

According to a second aspect, the present invention also provides a method for flame detection comprising:
detecting an intensity of radiation F in a fire band range of wavelengths from a characteristic blackbody-type radiated heat signature emitted by a flaming material; and
detecting an intensity of radiation G in a guard band range of wavelengths from an at least further part of the spectrum emitted by said material which serves in assisting rejection of false alarms,
wherein, the guard band wavelengths are shorter than the fire band wavelengths, and the guard band is narrower than the fire band and each band distinct from the other, and detecting a flame if:
F>0;
G>0; and
F>G.

Preferably, detecting an intensity of radiation G from a flame in a region of the spectrum associated with artificial light or sunlight.

Preferably, the method comprising detecting in a wavelength region of the spectrum of less than about 4 µm, less than about 3.2 µm, less than about 3 µm or less than about 2.55 µm.

Preferably, the method comprising detecting in a wavelength region of from about 0.6 µm to about 3.2 µm, from about 1 µm to about 3.2 µm, or from about 1 µm to about 2.2 µm.

Preferably, the method comprising arranging the guard band and fire band to be separated by a sensory gap of about 0.1 µm to about 1 µm, of about 0.2 µm to about 0.8 µm, of about 0.5 µm to about 0.7 µm, of about 0.6 µm.

Preferably, detecting the guard band within a range of about 0.2 µm and detecting the fire band within a range of about 0.4 µm.

Preferably, detecting fire band radiation having a wavelength range of: from about 1.6 µm to about 2.4 µm; from about 1.7 µm to about 2.3 µm; or from about 1.8 µm to about 2.2 µm.

Preferably, detecting guard band radiation having a wavelength range of: from about 0.6 µm to about 1.4 µm; from about 0.7 µm to about 1.3 µm; from about 0.8 µm to about 1.2 µm; or from about 1 µm to about 1.2 µm.

Preferably, rejecting or filtering-out radiation of regular modulation.

Most preferably, detecting a flame only upon detecting radiation of irregular modulation at about 1 Hz to about 30 Hz or about 1 Hz to about 25 Hz.

Preferably, detecting radiation F and G using a different but common sensor comprising PbS or InGaAs. Most preferably, arranging the two sensors with different optical filters.

According to a third aspect of the present invention, there is provided a flame detector as defined in the first aspect, in which the fire sensor and the guard sensor (hereinafter referred to as a first guard sensor) are arranged to act in the infrared regions of the spectrum and in which the first guard sensor is arranged to detect radiation of shorter wavelength than the fire sensor; the flame detector additionally comprising a second guard sensor arranged to act in the infrared regions of the spectrum;
in use, during detection of a flame, the first guard sensor detects an intensity of radiation G1 in a first guard band range of wavelengths, the fire sensor detects an intensity of radiation F in a fire band range of wavelengths, wherein the first guard band is narrower than the fire band and each band is distinct from the other, and the second guard sensor detects an intensity of radiation G2 in a second guard band, and positive detection of a flaming material depends upon the following criteria:
F>0;
G1>0;
G2>0;
F>G1; and
F>G2.

According to a further aspect, the present invention provides a flame detector comprising:
a first sensor, for detecting a characteristic blackbody-type radiated heat signature emitted by a flaming material, being arranged to detect radiation having a wavelength range of: from 1.6 µm to 2.4 µm; from 1.7 µm to 2.3 µm; or from 1.8 µm to 2.2 µm; and
a second sensor, for detecting an at least further part of the spectrum emitted by said material and which serves to assist in rejecting false alarms, being arranged to detect radiation having a wavelength range of: from 0.6 μm to 1.4 μm; from 0.7 μm to 1.3 μm; from 0.8 μm to 1.2 μm; or from 1 μm to 1.2 μm,
wherein each sensor comprises a detection zone manufactured from a material comprising lead sulphide (PbS) or indium gallium arsenide (InGaAs).

Preferably, additionally comprising a third sensor manufactured from lead sulphide (PbS) or indium gallium arsenide (InGaAs).

Preferably, wherein each of the first, second and third sensors are capable of detecting infrared, or the first and second sensors are capable of detecting infrared and the third sensor is capable of detecting ultra violet.

Preferably, the second sensor is arranged to detect a part of the radiation of a flame associated with artificial light or sunlight.

Preferably, the first sensor and/or second sensor are arranged to operate in the wavelength region of less than about 4 μm, less than about 3.2 μm, less than about 3 μm, or less than about 2.55 μm. Most preferably, the first sensor and/or second sensor are arranged to operate in a wavelength region of from about 0.6 μm to about 3.2 μm, or from about 1 μm to about 3.2 μm, or from 1 μm to 2.2 μm.

Preferably, detection at the second sensor and the first sensor is arranged to be separated by 0.1 μm to 1 μm, or by 0.2 μm to 0.8 μm, by 0.5 μm to 0.7 μm, or by 0.6 μm.

Most preferably, the second sensor detects over a range of about 0.2 μm and the first sensor detects over a range of about 0.4 μm.

Preferably, the detector is arranged to reject or filter-out radiation of regular modulation.

Most preferably, the detector is arranged to react only upon detecting radiation of irregular modulation at about 1 Hz to about 30 Hz or about 1 Hz to about 25 Hz.

Advantageously, the present invention typically relates to detection through defining a distinct guard band and a distinct fire band, with a sensory gap therebetween, at or around the expected maximum radiated heat energy portion of the spectrum. In particular, this detection is at wavelengths well below the 4.3 micron peak for $CO_2$.

Advantageously, by acting upon the specific heat signature of a flame across the spectrum, these flame detectors and associated methods are more capable of detecting fires from practically all fuels, whilst rejecting false alarms.

Advantageously, a 'dirty' flame does not block the heat signature produced by the flaming material and, therefore, does not prejudice detection.

Advantageously, by being distinct, a so-called sensory gap is provided between the guard band and fire band. The effects of the sensory gap are that it:
1) allows a single flame detector to clearly distinguish the fire band and guard band signals, which improves resolution and creates the ability to better distinguish between a light source (whether natural or synthetic) and a fire source—the light source being, typically, a source of false alarms;
2) by contrast, if the fire and guard bands are adjacent, then bleeding of signal from one band into the other band would occur and affect detection—making this an additional source of false alarms; and
3) it is easier for signal processing to process signals from distinctively separate bands.

Advantageously, the effects of the guard band being narrower than the fire band are as follows.
1) Owing to Wien's displacement law, the shoulder of peak wavelength is displaced with temperature. The effect of this is that synthetic light or sunlight gives a greater signal in the visible light spectra—such that, in the guard band, an equivalent signal intensity to the fire band is provided by a relatively narrower region of guard band. As such, greater specificity of rejection of false alarms is provided by having a narrower guard band.
2) Wide-band spectra analysis improves the types of sources which can be detected by the flame detector. Wider integrating areas minimise the impact of chemical emission bands (which bands are specific to particular gas species), which provides a more reliable black-body signal for fire detection. This provides greater coverage of sources of fires, for example cooler burning fires such as those created by hydrogen. Conversely, if the guard band is made wider, overall flame detection is reduced as less of the spectrum falls in the fire band.
3) A narrow guard band operates effectively to reduce false alarms whilst not affecting overall detection in the fire band.

Advantageously, by maintaining the same detector material within all sensors, degradation in unit performance over time and with variance in temperature is minimised, through pegging of the sensors to one another. Lead sulphide offers a relatively wide absorption band. Advantageously, lead sulphide sensors are amongst the least expensive infrared sensors on the market but can be appropriately adapted so as to provide very effective detectors. Beyond the simplification of supply chains and production, the main advantage to using a single sensor type for both sensors is the uniformity of response from each sensor. Through time, the environment can change or degrade the sensors and different sensors will behave differently according to those conditions. However, if the sensors are the same type of sensor, then it is fair to expect both sensors to degrade or change in either the same or a similar way over time. Accordingly, the sensors are effectively pegged to one another. A further consideration is the fact that the sensitivity of many sensors is affected by the temperature of the sensor, and lead sulphide is no exception. With the present invention, any changes in temperature are equally felt by both sensors, which again pegs their performance. Owing to the use of two optical filters (in the case of an $IR^2$ detector), each with a different transmission window, a detector operates as if it had two very different sensor substrates, whilst still keeping the benefits of a single sensor type. The addition of a third or subsequent sensor of the same type, potentially having its own optical filter, maintains this advantage.

An additional sensor adds another basic input into the fire decision, increasing reliability and rejection of false alarms. False alarm rejection can be further enhanced by considering the flame flicker produced during the burning of a material.

Advantageously, the present detectors are capable of being used behind standard glass, such as to separate them from dirty environments, whilst still maintaining their function. As such, this provides both practicality and an economic advantage over narrowband $CO_2$ detectors. Further, no heating of the detector unit is required. The present flame detectors can operate in difficult conditions without heaters and other accessories.

The present invention leads to significant false alarm rejection, universal fuel detection and all in an inexpensive detector.

As used herein, the term 'material' is intended to have its customary meaning of something which can be a solid, a liquid or a gas, or mixtures thereof.

BRIEF DESCRIPTION OF FIGURES

The invention will now be disclosed, by way of example only, with reference to the following drawings, in which.

DETAILED DESCRIPTION

Figure 1:
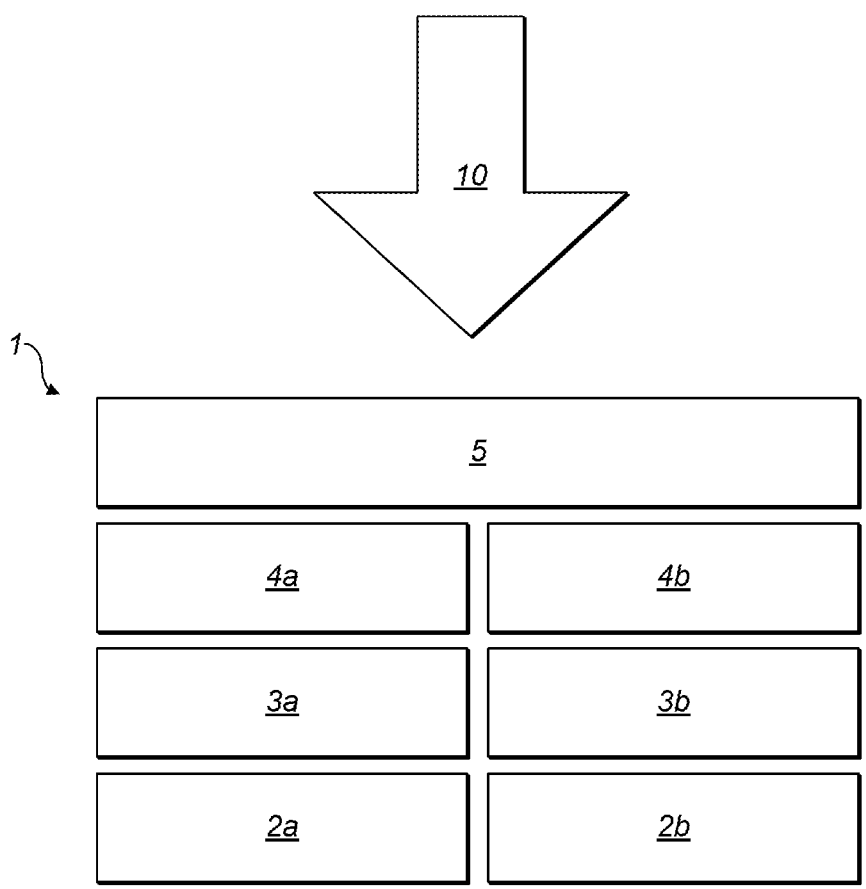
FIG. 1 is a schematic diagram of sensors and associated apparatus of a flame detector.

FIG. 1 shows aspects of a flame detector, identified generally by reference 1, specifically its sensors and their associated apparatus. The detector 1 includes a pair of infrared sensors 2a and 2b, a pair of optical filters 3a and 3b, a pair of spacers 4a and 4b and a visible filter 5. This type of detector 1 having two infrared sensors is often referred to as an $IR^2$.

The infrared sensors 2a; 2b are of the type commonly available in the marketplace, and in this example they are lead sulphide photoconductive sensors as manufactured by HAMAMATSU®. Each of the sensors 2a; 2b is associated with a corresponding optical filter 3a or 3b, respectively, and a quartz spacer 4a; 4b, respectively. The visible filter 5 is of the type found in remote control apparatus and is opaque to visible light, preventing substantially all light below 0.8 microns from reaching the sensors 2a; 2b. Specifically, as both sensors 2a; 2b are of the same type and have corresponding sensor characteristics, their respective performances will be pegged.

Optical filters 3a and 3b are both crystalline materials but have different optical characteristics in that they each only allow radiation of a particular range of wavelengths through, providing a first sensor 2a having a wavelength region of 0.6 to 1.4 microns and a second sensor 2b having a wavelength region of about 1.6 to 2.4 microns. The wavelength region of 0.6 to 1.4 microns defines a 'guard band' and sensor 2a together with its filter 3a can be considered a guard sensor, and the wavelength region of 1.6 to 2.4 microns defines a 'fire band' and sensor 2b together with its filter 3b can be considered a fire sensor.

As those skilled in the art will realise, the sensors and associated apparatus described above are just part of a flame detector 1, which detector 1 will additionally include various circuitry for comparing and analysing the signals received from the sensors 2a; 2b. The following is not shown in the Figures, but is present in a flame detector of this type. The detector 1 includes processing circuitry, analysis software and various outputs, for example light emitting diodes (LEDs) and/or relays for connecting to a fire panel.

In use, and as shown generally in FIG. 1, electromagnetic radiation emitted from a flaming material, identified as the arrow bearing reference 10, is incident upon the detector 1 and first passes through the visible filter 5, before passing through respective spacers 4a and 4b, then respective optical filters 3a and 3b, and, finally, falls upon respective sensors 2a and 2b. Owing to the optical filtering (optical filters 2a; 2b and the visible filter 5), radiation which is outside of the desired transmission wavelengths is substantially hindered and prevented from being transmitted to the sensors 2a; 2b. At the sensors 2a; 2b, the intensity of radiation signals in the desired wavelength ranges can be easily detected. Such signals detected by the sensors 2a; 2b are processed by the processing circuitry and analysed by the software, where the characteristics of the detected signals are compared with that of a flame, for example the signal amplitude, modulation regularity and proportional differences at specific wavelengths which are considered intrinsic to practically all flame types. The detector 1 will signal a 'fire' if there is a match in various characteristics and if pre-set thresholds are achieved, and activate a corresponding LED and switching relay in the fire monitoring control equipment. Additionally, signal (non-optical) filtering may occur, in combination or separately to analysis of the frequency of modulation of the source of radiation and/or analysis of the ratios of wavelengths being detected. In particular, for a 'fire' to be signalled, an intensity of radiation F detected in the 'fire band'—by sensor 2b—must be greater than an intensity of radiation G detected in the 'guard band'—by sensor 2a—and both sensors 2a and 2b must each be receiving a signal (F>0 and G>0). In order to improve performance with respect to false alarms, flame flicker analysis can be included during processing, which has the effect of discounting regularly modulated radiation which is typically emitted by simple hot objects, as compared to a flaming material. False alarm rejection can be further enhanced by considering the flame flicker produced during the burning of a material. For example, a natural fire will always have some turbulence created by differences within the fuel and airflows. Through looking at these phenomena, it is possible to create a detector which rejects virtually all false alarms. In particular, this is partly achieved through considering only those signals having a frequency of between, say, 1 and 25 Hertz (Hz). By way of an alternative, the infrared sensors could be of the indium gallium arsenide photodiode-type, as manufactured by HAMAMATSU®.

The present invention looks at a broad range of radiation produced by a flaming material and then separates the signal of the fire from that of background light. This can be achieved using the approximately short-wave infrared region (with respect to the embodiment of FIG. 1) and the ultraviolet region (with respect to the alternative embodiment of FIG. 3). With respect to the embodiment of FIG. 1, detection is achieved by splitting the spectrum in or around the short-/mid-infrared (region II of FIG. 2) into a fire band and a guard band. The fire band is conveniently located in a region at which one would expect to detect a characteristic black body-type heat signature emitted by a flaming material. The guard band is located to detect radiation of shorter wavelength, although still within the short-/mid-infrared.

Figure 2:
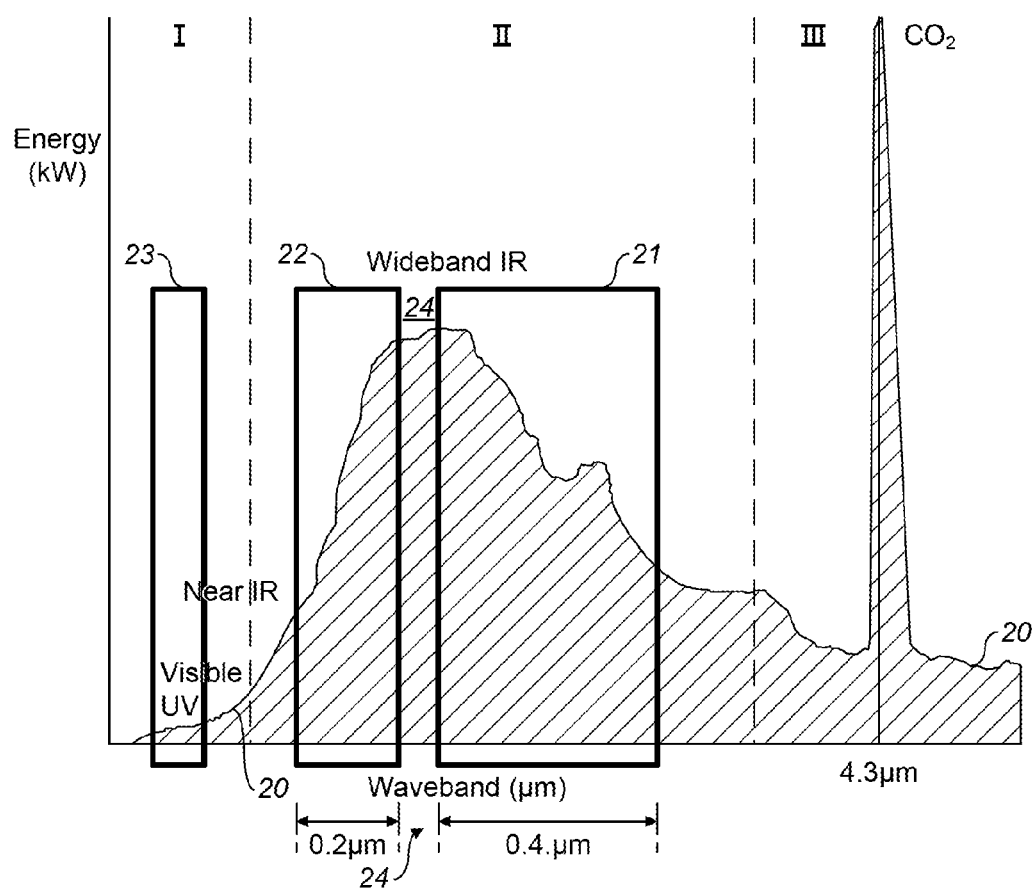
FIG. 2 is graphical representation of part of the spectrum emitted by a flaming material.

An example of this can be gleaned from FIG. 2, as FIG. 2 shows the approximate electromagnetic spectrum produced by burning petrol, as previously introduced. Those skilled in the art will understand that the peak in the short-/mid infrared region is the type of peak which is characteristic of black body-type radiated heat emitted by a flaming material. As such, by setting a fire band at around 1.6 microns to about 2.4 microns (or other distinct range within those extremes) and a guard band at around 0.6 microns to about 1.4 microns (or other distinct range within those extremes), a detector with two identical sensors can accurately monitor and detect the specific heat signature of a flame and reduce the occurrences of false alarms by comparing the fire band intensity with a corresponding intensity from the guard band which, in the case of a flame, will always be less.

FIG. 2 also shows the approximate location and range of wavelengths of a fire band 21, which is the right-most rectangular box, and the approximate location and range of wavelengths of a guard band 22, which is the middle rectangular box. FIG. 2 also shows the approximate location and range of wavelengths of a further sensor band 23, which is the left-most rectangular box, and which is located in the ultraviolet region. The locations are approximate—although in the cases of the fire band 21 and guard band 22, they are shown as being in the correct region of short-/mid-infrared where the characteristic black body-type heat signature emitted by a flaming material is expected—because the exact optimum location and ranges can alter, depending upon what material is flaming. By detecting a range of wavelengths at the guard band and fire band, this increases the potential for the detector to detect a flame, no matter which material is flaming. Accordingly, these detectors are appropriate for detecting flames from practically all fuels. Most preferably, the guard band 22 range of wavelengths detects over a range of 0.2 μm and the fire band 21 detects over a range of 0.4 μm. A sensory gap 24 is defined between the guard band 22 and fire band 21.

Figure 3:
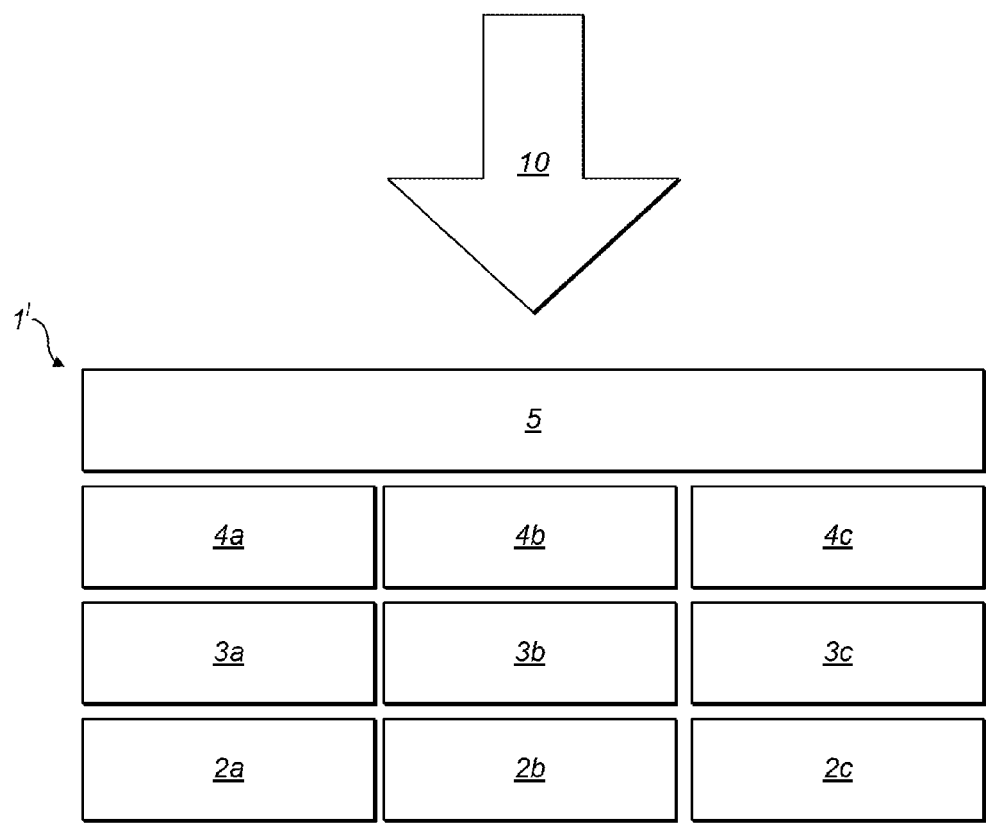
FIG. 3 is a schematic diagram of a second arrangement of sensors and associated apparatus of a flame detector.

FIG. 3 shows a second form of detector, indicated generally by reference 1', which is based upon the detector of FIG. 1; however, which includes an additional sensor and associated apparatus. This type of detector 1' having three infrared sensors is often referred to as an IR$^3$. The detector 1' has various features in common with the detector 1 of FIG. 1 which will not be described further in detail, and only the differences will be discussed.

Detector 1' includes a third sensor 2c, with a corresponding optical filter 3c, and corresponding quartz spacer 4c. Sensor 2c is an additional infrared sensor of the same type as described in relation to FIG. 1. Corresponding optical filter 3c will, typically, not have exactly the same optical characteristics as optical filter 3a; however, the sensor 2c and filter 3c are directed to the same function as they are intended to be a further guard sensor. As such, for a 'fire' signal to be initiated, an intensity of radiation F detected in the 'fire band' must be greater than an intensity of radiation G1 detected in the first 'guard band', and also greater than an intensity of radiation G2 detected in the second 'guard band', and all three sensors 2a; 2b; 2c must each be receiving a signal (F>0; G1>0; G2>0). The effect of this is to reduce false alarms caused by sunlight, etc. striking the face of the detector, as the detector must cross-check its fire signal with an additional guard signal before indicating a fire.

An additional sensor adds another basic input into the fire decision, increasing the reliability of the system and, as phenomena such as sunlight tends to move slowly across the face of the detector, this will tend to hit one sensor and then another. In the case of an IR$^2$, this may cause a fire activation if the light is modulated externally by, for example, a tree moving in the wind, however, in the case of an IR$^3$, the extra sensor and the way the signals are compared reduces this occurrence of false alarms. In particular, in terms of the decision making as to whether to indicate a fire, there are two decisions made with the IR$^3$ detector—a comparison between the first guard band and the fire band, and a comparison between the second guard band and the fire band.

Although in the above sensor 2c is described as an additional guard sensor in the infrared region, it could be an ultraviolet sensor, with very little revision to the hardware/software. The UV sensor would not be a guard sensor as such, as it would be intended to detect parts of the UV spectrum emitted by a flaming material. In particular, a UV/IR$^2$ unit is more sophisticated as it encompasses more of the spectrum, allowing the unit to make a better informed fire decision with fewer false alarms. Even though a flame produces only small amounts of UV radiation these can still be detected using the right type of sensor. An example of this is a UVtron from HAMAMATSU®. If using a UV sensor, filter 3c may be dispensed with; however, a UV quartz spacer 4c may be required.

The invention claimed is:

1. A flame detector comprising:
    a fire sensor, capable of detecting a characteristic black-body-type radiated heat signature emitted by a flaming material, the fire sensor being configured to detect an intensity of radiation F in a fire band range of wavelengths of from 1.6 μm to 2.4 μm; and
    a guard sensor, for detecting an at least further part of a spectrum emitted by said material and which serves to assist in rejecting false alarms, the guard sensor being configured to detect an intensity of radiation G in a guard band range of wavelengths, and the guard sensor being configured to detect radiation of shorter wavelength than the fire sensor, and
    wherein the guard band and fire band are infrared detection bands, the guard band range of wavelengths is narrower than the fire band range of wavelengths, and each band range of wavelengths is distinct and separated from the other by a sensory gap of 0.5 μm to 1 μm, wherein neither the fire sensor nor the guard sensor are configured to detect in a wavelength region of the spectrum above 3.2 μm, and
    the flame detector is configured to positively detect flaming material when (i) the fire sensor detects that the intensity of radiation F is greater than zero, (ii) the guard sensor detects that the intensity of radiation G is greater than zero, and (iii) the flame detector determines that the intensity of radiation F detected by the fire sensor is greater than the intensity of radiation G detected by the guard sensor.

2. The flame detector as claimed in claim 1, wherein the guard band range of wavelengths and fire band range of wavelengths are separated by a sensory gap of 0.5 μm to 0.7 μm, or of 0.6 μm.

3. The flame detector as claimed in claim 1, wherein the guard band range of wavelengths detects over a range of 0.2 μm.

4. The flame detector as claimed in claim 1, wherein the fire sensor and the guard sensor comprise a common sensor comprising PbS or InGaAs.

5. The flame detector as claimed in claim 1,
    wherein the guard sensor comprises a first guard sensor and a second guard sensor, the first guard sensor being configured to detect radiation of shorter wavelength than the fire sensor, and the second guard sensor being configured to operate in the infrared regions of the spectrum;
    wherein, during detection of a flame, the first guard sensor is configured to detect an intensity of radiation G1 in a first guard band range of wavelengths that is narrower than the fire band range of wavelengths and each band range of wavelengths is distinct and separated from the other, and the second guard sensor is configured to detect an intensity of radiation G2 in a second guard band range of wavelengths, and positive detection of a flaming material depends upon the following criteria:
    F>0;
    G1>0;
    G2>0;
    F>G1; and
    F>G2.

6. The flame detector as claimed in claim 1, wherein the flame detector is configured to detect a false alarm when the flame detector determines that the intensity of radiation F detected by the fire sensor is less than the detected intensity of radiation G detected by the guard sensor.

7. The flame detector as claimed in claim 1, wherein the guard sensor is configured to detect radiation having a wavelength range of from 1 μm to 1.2 μm, the fire sensor is configured to detect radiation having a wavelength range of from 1.8 μm to 2.2 μm, and the guard band range of wavelengths and fire band range of wavelengths are separated by a sensory gap of 0.6 μm.

8. A method for flame detection comprising:
using a fire sensor to detect an intensity of radiation F in a fire band range of wavelengths of from 1.6 μm to 2.4 μm from a characteristic blackbody-type radiated heat signature emitted by a flaming material, and without detecting an electromagnetic spectrum in a region above 3.2 μm; and
using a guard sensor to detect an intensity of radiation G in a guard band range of wavelengths from an at least further part of the electromagnetic spectrum emitted by said material which serves in assisting rejection of false alarms, and without detecting the electromagnetic spectrum in the region above 3.2 μm,
wherein, the wavelengths detected in the guard band range are shorter than the wavelengths detected in the fire band range, wherein the guard band and fire band are infrared detection bands, and the guard band range of wavelengths is narrower than the fire band range of wavelengths and each band range of wavelengths is distinct and separated by a sensory gap of 0.5 μm to 1 μm from the other, and
detecting a flame if (i) the intensity of radiation F is greater than zero, (ii) the intensity of radiation G is greater than zero, and (iii) the detected intensity of radiation F is greater than the detected intensity of radiation G.

9. The method as claimed in claim 8 comprising arranging the guard band range of wavelengths and fire band range of wavelengths to be separated by a sensory gap of 0.5 μm to 0.7 μm, or of 0.6 μm.

10. The method as claimed in claim 8 comprising detecting the guard band range of wavelengths within a range of 0.2 μm.

11. The method as claimed in claim 8 further comprising detecting a false alarm when the intensity of radiation F detected by the fire sensor is less than the detected intensity of radiation G detected by the guard sensor.

12. The method as claimed in claim 8, wherein the guard sensor detects radiation having a wavelength range of from 1 μm to 1.2 μm, the fire sensor detects radiation having a wavelength range of from 1.8 μm to 2.2 μm, and the guard band range of wavelengths and fire band range of wavelengths are separated by a sensory gap of 0.6 μm.

13. A flame detector comprising:
a first sensor for detecting a characteristic blackbody-type radiated heat signature emitted by a flaming material, being configured to detect radiation having only a wavelength range of 1.6 μm to 2.4 μm; and
a second sensor for detecting an at least further part of a spectrum emitted by said material and which serves to assist in rejecting false alarms, the second sensor being configured to detect radiation having a wavelength range of 0.6 μm to 1.4 μm, each sensor comprises lead sulphide (PbS) or indium gallium arsenide (InGaAs);
wherein neither the first sensor nor the second sensor are configured to detect in a wavelength region of the spectrum above 3.2 μm.

14. The flame detector as claimed in claim 13, additionally comprising a third sensor for detecting within either the infrared or ultraviolet part of the spectrum.

15. The flame detector as claimed in claim 13, wherein the first sensor is configured to detect radiation having a wavelength range of 1.7 μm to 2.3 μm.

16. The flame detector as claimed in claim 13, wherein the first sensor is configured to detect radiation having a wavelength range of 1.8 μm to 2.2 μm.

17. The flame detector as claimed in claim 13, wherein the second sensor is configured to detect radiation having a wavelength range of 0.7 μm to 1.3 μm.

18. The flame detector as claimed in claim 13, wherein the second sensor is configured to detect radiation having a wavelength range of 0.8 μm to 1.2 μm.

19. The flame detector as claimed in claim 13, wherein the second sensor is configured to detect radiation having a wavelength range of 1 μm to 1.2 μm.

20. The flame detector as claimed in claim 13, wherein the flame detector is configured to detect a false alarm when the flame detector determines that the intensity of radiation F detected by the fire sensor is less than the detected intensity of radiation G detected by the guard sensor.

21. The flame detector as claimed in claim 13, wherein the first sensor is configured to detect radiation having a wavelength range of from 1.8 μm to 2.2 μm, the second sensor is configured to detect radiation having a wavelength range of from 1 μm to 1.2 μm, and the wavelength ranges are separated by a sensory gap of 0.6 μm.

* * * * *